US012669718B2

(12) United States Patent
Flynn et al.

(10) Patent No.: US 12,669,718 B2
(45) Date of Patent: Jun. 30, 2026

(54) OPTICAL DISPLAY DEVICE

(71) Applicant: InnerScene Limited, Quedgeley (GB)

(72) Inventors: Sean Flynn, Gloucester (GB);
Jonathan Clark, Gloucester (GB)

(73) Assignee: INNERSCENE LIMITED, Quedgeley
(GB)

( * ) Notice: Subject to any disclaimer, the term of this
patent is extended or adjusted under 35
U.S.C. 154(b) by 498 days.

(21) Appl. No.: 18/103,048

(22) Filed: Jan. 30, 2023

(65) Prior Publication Data

US 2023/0244086 A1     Aug. 3, 2023

(30) Foreign Application Priority Data

Jan. 29, 2022     (GB) ...................................... 2201172

(51) Int. Cl.
| | |
|---|---|
| *G02B 30/40* | (2020.01) |
| *G02B 3/00* | (2006.01) |
| *G02B 5/02* | (2006.01) |
| *G02B 27/30* | (2006.01) |

(52) U.S. Cl.
CPC ........... *G02B 30/40* (2020.01); *G02B 3/0056*
(2013.01); *G02B 5/0278* (2013.01); *G02B*
*5/0294* (2013.01); *G02B 27/30* (2013.01);
*G02B 2003/0093* (2013.01)

(58) Field of Classification Search
CPC .... G02B 30/40; G02B 3/0056; G02B 5/0278;
G02B 5/0294
See application file for complete search history.

(56) References Cited

U.S. PATENT DOCUMENTS

| | | | | |
|---|---|---|---|---|
| 5,892,789 | A * | 4/1999 | Yasui | ........................ H01S 3/10 |
| | | | | 372/105 |
| 9,720,228 | B2 * | 8/2017 | Harrison | .............. G02B 3/0056 |
| 2002/0097511 | A1 * | 7/2002 | Kanematsu | ............ G02B 7/008 |
| | | | | 359/811 |
| 2017/0098740 | A1 * | 4/2017 | Ohmae | ............... H01L 25/0753 |
| 2018/0191967 | A1 * | 7/2018 | Kester | .................... G02B 5/201 |
| 2018/0246270 | A1 * | 8/2018 | Di Trapani | .......... G02B 6/0055 |

FOREIGN PATENT DOCUMENTS

CN            102023321 A  *  4/2011

* cited by examiner

*Primary Examiner* — Lucy P Chien
(74) *Attorney, Agent, or Firm* — Umberg Zipser LLP

(57)            ABSTRACT

An optical display device arranged to create a perception of
a sky scene in output light, the optical display device
comprising: a collimated light generation system comprising
a light source and a collimating system; a diffuse light
generation system, and; an output aperture for the output
light; the diffuse light generation system arranged to gener-
ate a diffuse skylight component in the output light, and the
collimated light generation system arranged to generate a
collimated sunlight component in the output light, wherein
the light source comprises a planar array of light sources
arranged on a common substrate, the collimating system
comprises a planar array of collimating members that com-
prise lenses formed integrally from a common substrate, the
light sources each arranged with an associated collimating
member so that light emitted from the light sources is
collimated, and the planar array of light sources and the
planar array of collimating members are aligned with a plane
of the output aperture.

22 Claims, 7 Drawing Sheets

OPTICAL DISPLAY DEVICE

TECHNICAL FIELD

The present disclosure relates generally to electrically operated optical display devices for creating an artificial skylight, wherein an observer experiences a perception of a sky scene when gazing into an output aperture of said device.

BACKGROUND

A device that creates a perception of a skylight is provided in EP3181999. Said device generates a collimated light beam from a light source and collimating lens array. The collimated light beam is transmitted to and through a partially transparent diffuse light generator. A portion of the collimated light beam is scattered by the diffuse light generator by Rayleigh scattering as blue, diffuse light to provide an artificial skylight component and a portion of the collimated light beam passes through the diffuse light generator to provide an artificial sunlight component. This device may be implemented as an artificial skylight on an interior wall or ceiling of a building to provide a cost effect alternative to an actual skylight, or to implemented a skylight where one is not naturally possible, e.g. in room with no exterior wall.

Such devices are expensive and complex to construct since they require large arrays of separate light sources and lenses. Precise alignment of the light sources and collimating lens array is required to avoid cues in the artificial skylight component and artificial sunlight component that provide indications that they are artificial. Moreover, such devices are large and therefore complex to fit to an interior of a building.

Therefore, in spite of the effort already invested in the development of said devices further improvements are desirable.

SUMMARY

The present disclosure provides an optical display device arranged to create a perception of a sky scene in output light, the optical display device comprising: a collimated light generation system comprising a light source and a collimating system; a diffuse light generation system, and; an output aperture for the output light; the diffuse light generation system arranged to generate a diffuse skylight component in the output light, and the collimated light generation system arranged to generate a collimated sunlight component in the output light, wherein the light source comprises a planar array of light sources arranged on a (first) common substrate, the collimating system comprises a planar array of collimating members that comprise lenses arranged on a (second) common substrate (which may be separate from the first common substrate), the light sources each arranged to project to an individual collimating member so that light emitted from the light sources is collimated, and the planar array of light sources and the planar array of collimating members are aligned with a plane of the output aperture.

By implementing the light sources on a common board and the lenses formed integrally to each other on a common sheet, the board and sheet may be arranged as a laminate to provide a particularly compact device, which is cost effective to assemble. In particular, since the lenses are formed integrally to each other they may be arranged with a high degree of relative accuracy such that their output has a high degree of accuracy.

As used herein the term "planar array" in respect of the light sources may refer to the light sources arranged on, including arranged substantially on, a common plane, which may extend in a lateral and longitudinal direction.

As used herein the term "common substrate" in respect of the light sources may refer to the same planar substrate, e.g. a board or a sheet material, to which the light sources are mounted in alignment on.

As used herein the term "planar array" in respect of the collimating members sources may refer to the collimating members arranged on, including arranged substantially on, a common plane, which may extend in a lateral and longitudinal direction.

As used herein the term "integrally on a common substrate" in respect of the collimating members may refer to the same planar substrate, e.g. a transparent sheet material, to which the collimating members are formed from, e.g. by moulding.

In embodiments, the lenses of the planar array are formed of a plastic based material by compression moulding. By forming the lens array of plastic that is compression moulded, it may be formed in a cost-effective manner and with high accuracy.

In embodiments, the lenses are hexagonal (including substantially hexagonal) or square (including substantially square) in shape. By implementing hexagonally or square shaped lenses, they may be conveniently shaped contiguously, e.g. so that they directly adjoin each other or are in close proximity to each other. Such a formation in combination with an integral lens array may permit a particularly compact device.

In embodiments, the lenses are inclined on the plane of the planar array of the collimation system to incline the output light with respect to the output aperture. By arranging the lenses to be inclined to a plane of defined by the lens array, the output light may project at an angle through the output aperture, which may provide a more realistic sky scene.

In embodiments, the collimating system comprises a second planar array of collimating members that comprise lenses formed integrally from a (third) common substrate. In embodiments, an optical axis of the lenses of the planar array is aligned with (including to intersect e.g. in cases of the collimators of one of the arrays being inclined to the other to incline the output light) an optical axis of the lenses of the second planar array. A second distinct array of collimating lenses may achieve a greater level of collimation that the first array on its own. Moreover, a less precise/more cost effective first array may be implemented where there is a second array present. The second and/or the first array of collimating member may be arranged to include the output light.

In embodiments, a light guide, that may total internally reflect received light, is arranged to couple, including directly without an intermediate member or airgap, the light sources to the lenses of the collimating system. By implementing a light guide to couple light from the light sources to the lenses of the collimator, the device may have high efficiency due to minimal light escaping. Moreover, hot spots may be minimized since the light may be uniformly distributed to the lenses.

In embodiments, the light guides are formed integrally from a (fourth) common substrate which is planar. By implementing the light guides on a common sheet, the sheet may be arranged as a laminate to provide a particularly compact device, which is cost effective to assemble. In particular, since the light guides are formed integrally to each other they may be arranged with a high degree of relative accuracy such that their output has a high degree of accuracy. In embodiments, the light guides are formed integrally with the collimating member, e.g. both on the same common substrate.

In embodiments, the light sources comprise optical fibres arranged in apertures in the common substrate. Such an arrangement may provide a convenient alternative to LEDs which requires less complex manufacturing.

In embodiments, the light sources are printed on the common substrate. By printing the light sources (e.g. a semiconductor of an LED) directly onto a substrate, the light source array may be formed in a cost effective manner and with high accuracy.

In embodiments, the common substrate of the light sources is arranged as a printed circuit board (PCB). By implementing a PCB (e.g. a laminated sandwich structure of conductive and insulating layers) the light sources maybe cost-effectively be electrically connected on a common substrate. Conductive layers of the common substrate may provide convenient electrical connection of the LEDs to control circuitry (e.g. a control system and a power source).

In embodiments, the light sources are LEDs, which may have a chip size or including an dimension of an emitting portion of one of the following: less than 100 μm (e.g. micro LEDs, which may have a minimum size of 10 μm) or; 100-200 μm (e.g. mini LEDs), and; 0.1 mm-3 mm. By implementing LEDs of such a small size range the device may be compact and/or cost effective to manufacture.

In embodiments, a diameter of the lenses is less than 1 mm or; 1-2 mm; 1 mm-30 mm, and; 5-20 times the size or range of the chip size of the LEDs. Any of the aforesaid size ranges of lenses may be combined with any of the disclosed size ranges of LEDs. By implementing lenses of such a small size range the device may be compact and/or cost effective to manufacture.

In embodiments, an optical element arranged to diffusively reflect stray light downstream of the collimating system. By implement an optical element optical aberrations in the sky scene may be reduced.

As used herein the term "stray light" may refer to any light that is propagated outside of the optical direction intended by the collimation system. For example the stray light may propagate with a substantial component in a direction across the optical axis of the lenses of the collimating system.

In embodiments, the optical element is arranged as a plurality of cells, with an open entrance end to receive light from the collimating system and an open exit end to output light. Such an arrangement may provide a convenient means for filtering stray light.

In embodiments, an axis of the cells is aligned with the optical axis of the lenses. By arranging the cells of the optical element to be positioned to align around the lenses, precise filtering/attenuating of the stray light from the output light may be provide without the thickness of the cells interfering with the collimated light.

In embodiments, a pitch of the cells is less than a diameter of the lenses. With such an arrangement, a greater proportion of said stray light may be filtered. In embodiments, the cells are arranged so that a central axis of at least some of the cells is not aligned with the optical axis of the lenses. For example, the cells may be arbitrarily positioned with respect to the lenses, which may simplify the assembly process. Alternatively, the cells may be arranged with a repeating units of several cells aligned to each lens, for example, the frontal area of each lens may be exactly overlapped by the same repeating unit of 4-50 cells.

In embodiments, a depth of the cells is 2-120 times or 10-50 a pitch of the cells. With such an arrangement, sufficient stray light may be absorbed without too much attenuation of the collimated light/production of the diffuse light.

In embodiments, the optical element is arranged to incline the output light with respect to the output aperture. By arranging the optical element to be inclined to a plane of defined by the lens array, the output light may project at an angle through the output aperture, which may provide a more realistic sky scene.

In embodiments, the display device comprises an alignment system, which is arranged to align the first common substrate and the second common substrate such that the light sources are each arranged with an associated collimating member (e.g. so that they are in alignment). The alignment system may in an engaged position provide convenient alignment of the substrates to each other, since precise alignment of the light sources and the lenses is critical. The alignment system may include one or more of the following configurations: protrusions (e.g. pins) that extend through apertures in one or both the substrates; aligned peripheral edges that are held in alignment with each other by a clamp, which may be formed as part of a housing of the display device.

In embodiments, the display device comprises a thermal compensation arrangement, which is configured to maintain an optical axis of the lenses in alignment (e.g. so that an alignment condition is met) with a central axis of the associated light source at an operating temperature of said device.

By implementing a thermal compensation arrangement, it may be ensured that as the device expands in use (e.g. due to thermal energy transferred from the light sources and/or associated electronics), the lenses (e.g. all of most of the lenses) remain aligned with the light sources.

As used therein the term "optical axis" in respect of the lenses may refer to a straight line passing through a geometrical centre of a lens. A path of a light ray along said axis may be perpendicular to an exterior surface of the lens and, as such, may be unchanged.

As used therein the term "central axis" of the light sources may refer to a straight line passing through a geometrical centre of a light source and/or a geometric centre of a light cone emitted by the light source. For an LED light source, it may include a centre of the semiconductor chip.

As used therein the term "alignment" in respect of the optical axis and central axis may refer to alignment in a lateral and longitudinal plane (which may be perpendicular to the optical axis and central axis that extend in a depth direction). Said axis may be exactly aligned or substantially aligned in the lateral and/or longitudinal directions. Said alignment may apply to all of the lenses and light sources on the substrates.

In embodiments, the alignment may be quantified as a percentage of the width of the lens, wherein the lens width may be the distance between the periphery of the lens. Hence a 6.5% misalignment for a 1 mm lens width would be 0.065 mm. In embodiments, the aligned condition may be met is there is less than: 6.5%; 5%; 10%; 15% misalignment.

As used therein the term "operating temperature" may refer to a range of the temperatures (since ambient temperature may vary) or a single temperature. It may comprise the steady state temperature that the device achieves in operation, as opposed to a ramp-up non-steady state temperature, which is experienced as the device is initially switched on from typically an ambient temperature. The operating temperature may be: 10-30 degrees Celsius; 0 degrees C.-40 degrees Celsius; and; at least 10 or 20 degrees Celsius above ambient temperature. The temperature may be measured at either of the substrates or at another location of the device.

In embodiments, the thermal compensation arrangement is configured to maintain said alignment during a ramp-up phase, wherein the temperature is ramped up from ambient to a steady-state operating temperature.

In embodiments, the optical axis of the lenses is maintained in alignment with the central axis of the light source, such that a periphery of a light cone of a light source is maintained within a periphery of an associated lens.

By maintaining the light cone of the light sources within the bounds of the periphery of the lens it may be ensured that the light is accurately collimated by the device.

As used therein the term "periphery" in respect of the lens may refer to an extremity of the lens (e.g. distal the optical axis) where it still provides the collimation function.

In embodiments, the thermal compensation arrangement comprises a thermal expansion coefficient $\alpha 1$ of the first common substrate of the light sources and a thermal expansion coefficient $\alpha 2$ of the second common substrate of the lenses.

In embodiments, $\alpha 1$ and $\alpha 2$ are selected such that the optical axis of the lenses is maintained in alignment (as defined previously) with the central axis of the light source at the operating temperature, and is not maintained in alignment outside of said operating temperature. For example $\alpha 1$ and $\alpha 2$ may be selected to be within ±10 or 20 or 30% or 40% of each other at the operating temperature/operating temperature range.

With such an implementation, as the device heats up to its steady state operating temperature, the lenses and light sources may be brought into alignment with the lenses and maintained in alignment. This may be achieved by assembling the device at its operating temperature and ensuring alignment at this temperature.

In embodiments, $\alpha 1$ and $\alpha 2$ are selected (e.g. matched including substantially matched) such that the optical axis of the lenses is maintained in alignment with the central axis of the light source at the operating temperature, and is maintained in alignment outside of said operating temperature (e.g. for all or some temperatures outside of the operating temperature).

With such an implementation, the device may automatically maintain alignment regardless of temperature, including during ramp-up and steady state phase. In such an example, the first and second common substrate can be made from the same material or one or more materials that have the combined functional equivalent thermal expansion coefficient (e.g. for ramp-up and steady state). Such an arrangement may be advantageous since the device may perform optically as indented when immediately switched on.

In embodiments, the diffuse light generation system comprises a diffuser. In embodiments, the light source forms a diffuse light source and the diffuser is arranged to convert a portion of the light from the light source to diffuse light. In embodiments the diffuse light generation system includes a diffuse light source coupled to an edge of the diffuser. An edge lit diffuser with its own light source may complement the device by introducing the diffuse light with minimal thickness increase of the device.

In embodiments, the diffuser is arranged downstream or upstream of the collimating system. In embodiments, the diffuser is arranged with the collimated sunlight component to project therethrough. By implementing the collimated light to project though the diffuser, the diffuse light may be introduced with minimal thickness increase of the device.

In embodiments, the diffuser is arranged upstream of the collimating system and is arranged as a waveguide with portions arranged to decouple internally reflected light from the waveguide an redirect it as diffuse light propagated outside of the waveguide.

In embodiments, the common substrate of the light source includes a first group of light sources operable to project light that may correspond in colour to the sunlight component. In embodiments, the common substrate of the light source a diffuse light source that includes a second group of light sources operable to project light that may correspond in colour to the skylight component. By implementing the light source and diffuse light source on the same substrate, they may be cost effectively formed. The second group of light sources may either be configured to project light that corresponds in colour to the skylight component, or be another colour (e.g. the same colour as for the first group of light sources) with a separate filtering system to impart a colour.

In embodiments, the second group of light sources are positioned away from a central axis of the collimating members. By arranging the second group of light sources away from the optical axis of the collimating members, it may be ensured that the light from the second group is not substantially collimated (e.g. they may project though voids between the collimating members) whereas the first group of light sources may be aligned with said optical axis so that that are collimated. In embodiments, the light sources of the second group are arranged with a primary axis of projection to project though voids between the collimating members.

As used herein the "primary axis of projection" may refer to an axis aligned to the main direction of projection (e.g. a normal to the chip of the LED, which may be the direction through a peak of a luminance profile), which is arranged through a centre of the light source (e.g. a centre of the chip of the LED).

In embodiments, the light sources of the first group of light sources are arranged with the light sources of the second group of light sources positioned therebetween (e.g. when considered in a lateral and/or longitudinal direction).

In embodiments, the diffuse light source and light sources are independently controllable to adjust and intensity and/or color (e.g., CCT) of the respective sunlight and/or skylight components. By allowing an intensity of the sunlight component and skylight component to be separately selected, the intensity of one or each component may be tuned to the room in which the device is installed. By allowing a CCT of the sunlight component and skylight component to be separately selected different sky scenes may be implemented in the output light.

In embodiments, a depth of the optical display device is less than 5 or 2 or 1 cm. It has been found that with such a thickness range the device can be fitted to interiors of buildings without notable structural adaptation, e.g. the forming of a cut-out to sink the device into. Such an arrangement may be cost effective to install.

The present disclosure provides a kit of parts for assembly into the optical display device of any preceding embodiment, or another embodiment disclosed herein.

The present disclosure provides use of the device of any preceding embodiment or another embodiment disclosed herein for creating a perception of a sky scene.

The present disclosure provides a method of creating a perception of a sky scene in output light. In embodiments, the method comprises generating a collimated sunlight component in the output light with a planar array of light sources arranged on a common substrate, which project through a collimating system that is arranged as a planar array of collimating members that comprise lenses arranged integrally on a common substrate, and; generating a diffuse skylight component in the output light with a diffuse light generation system.

The method may comprise aligning, with a thermal compensation arrangement, a central axis of the light source and an optical axis of the lenses at an operating temperature of said device.

The present disclosure provides a method of assembling a device to create a perception of a sky scene in output light. In embodiments, the method comprising arranging the following items on parallel planes to each other: a planar array of light sources arranged on a common substrate; a planar array of collimating members that comprise lenses arranged integrally on a common substrate, and; an output aperture.

In embodiments, the method comprises assembling the planar array of collimating members (that comprise lenses arranged integrally on the common substrate) on the planar array of light sources (arranged on the common substrate) followed by assembling this arrangement in a common housing. Alternatively, the planar array of light sources is arranged in the housing followed by assembling the planar array of collimating members on the planar array of light sources. These steps may then be followed by assembling the output aperture (e.g. a planar transparent viewing member) on or in the housing.

In embodiments, the method comprises aligning with an alignment system (e.g. by engaging the alignment system), the common substrate of the light sources and the common substrate of the lenses such that the light sources are each arranged with an associated collimating member.

In embodiments, the method comprises assembling the device at an operating temperature of the device and ensuring that at said operating temperature an alignment condition between the collimating members and light sources is met.

In embodiments, the method comprises forming the light sources of the common substrate The methods may implement any feature of any preceding embodiment, or another embodiment disclosed herein.

The preceding summary is provided for purposes of summarizing some embodiments to provide a basic understanding of aspects of the subject matter described herein. Accordingly, the above-described features are merely examples and should not be construed to narrow the scope or spirit of the subject matter described herein in any way. Moreover, the above and/or proceeding embodiments may be combined in any suitable combination to provide further embodiments. Other features, aspects, and advantages of the subject matter described herein will become apparent from the following Detailed Description of Embodiments, Figures, and Claims.

BRIEF DESCRIPTION OF FIGURES

Aspects, features and advantages of embodiments of the present disclosure will become apparent from the following description of embodiments in reference to the appended drawings in which like numerals denote like elements.

DETAILED DESCRIPTION OF EMBODIMENTS

Figure 1:
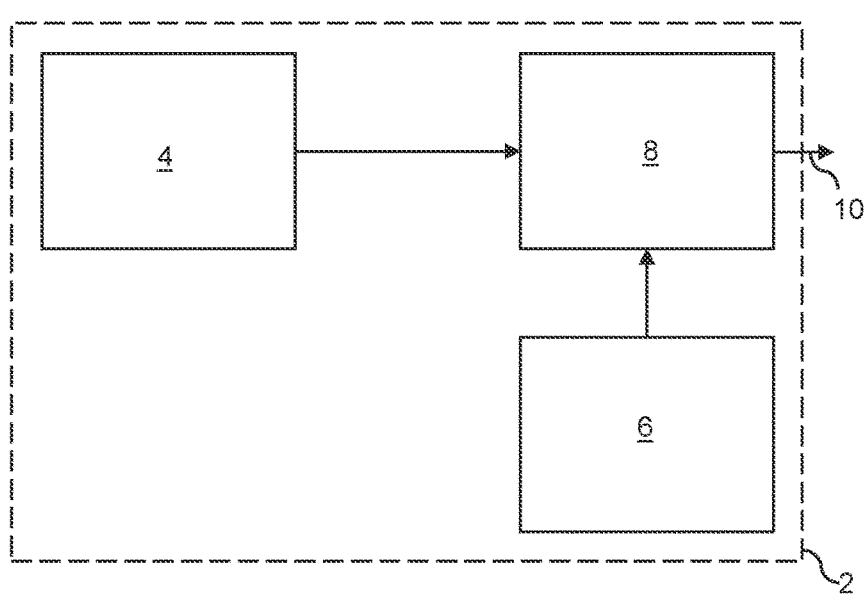
FIG. 1 is a block system diagram showing an embodiment optical display device.

Before describing several embodiments of the device, it is to be understood that the device is not limited to the details of construction or process steps set forth in the following description. It will be apparent to those skilled in the art having the benefit of the present disclosure that the device is capable of other embodiments and of being practiced or being carried out in various ways.

The present disclosure may be better understood in view of the following explanations:

As used herein the term "optical display device" or "device" may refer to electrically operated optical apparatus that is capable of providing an observer a perception of a sky scene when gazing into an output aperture of the device. The device may be dimensioned such that it is suitable for attachment to a ceiling or wall of an interior or a building.

As used herein the term "perception of infinite depth" may refer to a depth of an object (e.g. the sky and/or sun) in three dimensions being perceived as infinitely far away from an observer with stereopsis (i.e. binocular vision). A perception of infinite depth may be provided by one or more of the following monocular or binocular visual cues presented to an observer when looking into an output aperture of the device: motion parallax; interposition: aerial perspective; accommodation; stereopsis; convergence, and; other related cues. The condition of infinite depth may be determined based on gaze vectors of the eyes of an observer having the same and/or a similar alignment when looking into the device as for looking at the sky and/or sun in real life. The condition of infinite depth based on motion parallax may be determined based on the image of the sun appearing to be projected from the same location, e.g. moving, as an observer moves laterally and/or longitudinally across the output aperture. An observer user may maintain the same gaze vector associated with infinite depth during said motion.

As used herein the term "perception of a sky scene" may refer an observer perceiving a sky scene as being present in the real world, based on the construction by the device of a virtual sky scene that is sufficiently representative, e.g. in terms of chromatic and spatial distribution of light, to present as in the real world.

As used herein the term "sky scene" may refer to a scene comprising a sky that an observer observes when gazing through a window (e.g. in a side wall or ceiling) of a structure. A sky scene may include a skylight component and a sunlight component as defined herein. It may include a circular (or substantially circular) sun coloured image, which is surrounded by a blue sky component (or other colour representative of the sky).

As used herein the term "skylight" or "skylight component" or "diffuse light component" may refer to artificial light that is representative of skylight, which can include daylight, sunset or sunrise. It may be representative of skylight in respect of one or more of: colour, e.g. as defined by a CCT (e.g. 5000-10000); diffusivity; luminance profile or intensity; other suitable parameter, and; a variance of any of the aforesaid over an output aperture of the device. The diffuse light component may be uniform such that is does not vary by more than 10% or 20% or 30% or 40% over the entire output aperture, e.g. in terms of one or more of: colour diffusivity; luminance profile; intensity, and other suitable parameter. More particularly, said one or more parameters may be uniform to the extent where they do not vary by more than 10% or 20% or 30% or 40% for any given circular area on the output aperture of 10 mm diameter over at least 90%.of the output aperture. In a particular example, the diffuse light is propagated over a HWHM solid angle that is at least 4 times larger or 9 times larger or 16 times larger than for the subtending HWHM solid angle of the sunlight measured in Sr.

As used herein the term "sunlight" or "sunlight component" or "direct light component" may refer to artificial light that is representative of sunlight. It may be representative of sunlight in respect of one or more of: colour, e.g. as defined by a CCT (e.g. 3000-5000 k); divergence (e.g. an angle of divergence of the light rays may be no more than 5 or 2 or 1 or 0.5 degrees); luminance profile or intensity; other suitable parameter, and; a variance of any of the aforesaid over an output aperture of the device. In a particular example, the luminance profile of the sunlight has a narrow peak in the angular distribution around the direction of propagation which is subtended by a HWHM solid angle smaller than 0.2 sr or 0.3 sr. The sunlight may present, to a user when looking into the device, as a circular disc positioned at infinity.

As used herein the term "collimated light" may refer to light that has been processed by a collimated light generation system, which may form the sunlight component.

As used herein the term "output aperture" may refer to a viewing window of the device into which an observer can gaze. The output aperture may be 0.5-2 m×0.5-2 m. The output aperture outputs output light which is generated by the device. The output may be defined by a transparent panel, that can include glass or plastic.

As used herein the term "reflective member" may refer to an object that is capable of reflecting an image by specular reflection. It can include a member with any surface in which the texture or roughness of the surface is smaller (smoother) than the wavelength of the incident light. It may include surfaces formed of one or more of the following reflective materials: metals; metal oxides, and; dielectric materials. Examples of which include silver, aluminium, a titanium oxide based material including titanium dioxide or titanium trioxide. Any of the aforementioned may be applied as a thin coating on a glass carrier.

As used herein the term "diffuse light generator" or diffuse light generation system" may refer to a device capable of generating a diffuse light component, e.g. light which is scattered in many angles as opposed to one angle as with specular reflection. The diffuse light generator may generate the diffuse light by reflecting incident light as diffuse light or may be at least partially transparent and generate diffuse light in the light transmitted therethrough. The diffuse light generator may be implemented as one or more of the following: particles to scatter light; conical micro cones; micro lenses; quantum dots; surface features, including surface etching, and; other suitable implementation.

As used herein the term "scattering light" may refer to a process performed on incident light by the diffuse light generator to generate diffuse light, any may include Rayleigh scattering.

As used herein the term "particles to scatter said light" may refer to particles with a diameter selected to scatter some or all wavelengths of visible light. The diameter of the particles may be micro or nano (e.g. to operate in the Rayleigh regime). The diffuse light generator can include said particles arranged in a medium. Examples include titanium dioxide suspended in PMMA.

As used herein the term "light guide panel" may refer to a generally planar member, which is arranged to convey light in the in plane direction, e.g. by total internal reflection. The light guide panel may be edge lit, e.g. by a light source. The light guide panel may be implemented as the diffuse light generator.

As used herein the term "light source" may refer to any arrangement capable of generating artificial light. It can include arrangements that transform electrical current into luminous radiation. The light may have wavelengths in the range of 400-700 nm. The light source can include one or more of the following: a white light source, or perceived as such by the eye, e.g. an incandescent lamp, a fluorescent lamp, a mercury vapor discharge lamp; an LED or a white light laser diode (that is, such that the primary source is combined with a phosphor or several phosphors) or a combination of LEDs or laser diodes of different colour, and; other suitable light source. The light source may include a light guide to receive light from an emitting portion and convey the light, e.g. by total internal reflection, to an output surface. The light source may be arranged to emit with a CCT of 3K to 20K, or over a daylight locus. The luminance profile may not vary by more than 20% over any area circular area of 10 mm diameter.

As used herein the term "chromatic system" may refer to an arrangement capable of imparting a particular colour to light, e.g. from the light source. The colour may be representative of skylight scene, including daylight, sunset or sunrise.

As used herein the term "collimated light generation system" or collimating system may refer to a single (e.g. a collimating member) or a distributed system for processing light from the light source to the collimated light. It may include one or more of the following: a lens, including a Fresnel lens; a parabolic reflector; a closed cell structure, through the cells of which light is projected, and; other suitable system. The collimated light generation system may include a light source.

As used herein, the term "electrical circuitry" or "circuitry" or "control electrical circuitry" may refer to one or more hardware and/or software components, examples of which may include: an Application Specific Integrated Circuit (ASIC); electronic/electrical componentry (which may include combinations of transistors, resistors, capacitors, inductors etc); one or more processors; a non-transitory memory (e.g. implemented by one or more memory devices), that may store one or more software or firmware programs; a combinational logic circuit; interconnection of the aforesaid. The electrical circuitry may be located entirely at the device, or distributed between one or more of: the device; external devices; a server system.

As used herein, the term "processor" or "processing resource" may refer to one or more units for processing, examples of which include an ASIC, microcontroller, FPGA, microprocessor, digital signal processor (DSP), state machine or other suitable component. A processor may be configured to execute a computer program, e.g. which may take the form of machine readable instructions, which may be stored on a non-transitory memory and/or programmable logic. The processor may have various arrangements corresponding to those discussed for the circuitry. As used herein, any machine executable instructions, or computer readable media, may be configured to cause a disclosed method to be carried out, e.g. by the device or system as disclosed herein, and may therefore be used synonymously with the term method, or each other.

As used herein, the term "communication resources" or "communication interface" may refer to hardware and/or firmware for electronic information transfer. The communication resources/interface may be configured for wired communication ("wired communication resources/interface") or wireless communication ("wireless communication resources/interface"). Wireless communication resources may include hardware to transmit and receive signals by radio and may include various protocol implementations e.g. the 802.11 standard described in the Institute of Electronics Engineers (IEEE) and Bluetooth™ from the Bluetooth Special Interest Group of Kirkland Wash. Wired communication resources may include; Universal Serial Bus (USB); High-Definition Multimedia Interface (HDMI) or other protocol implementations. The device may include communication resources for wired or wireless communication with an external device and/or server system.

As used herein, the term "external device" or "external electronic device" or "peripheral device" may include electronic components external to the device, e.g. those arranged at a same location as the machine or those remote from the device, which communicate with the device over a computer network. The external device may comprise a communication interface for communication with the machine and/or a server system. The external device may comprise devices including: a smartphone; a PDA; a video game controller; a tablet; a laptop; or other like device.

Referring to FIG. 1, the device 2 comprises a collimated light generation system 4, a diffuse light generation system 6, and; an output aperture 8 for output light 10.

The collimated light generation system 4 generates a collimated sunlight component 12 in the output light 10. The diffuse light generation system 6 generates a diffuse skylight component 14 in the output light 10.

Figure 2:
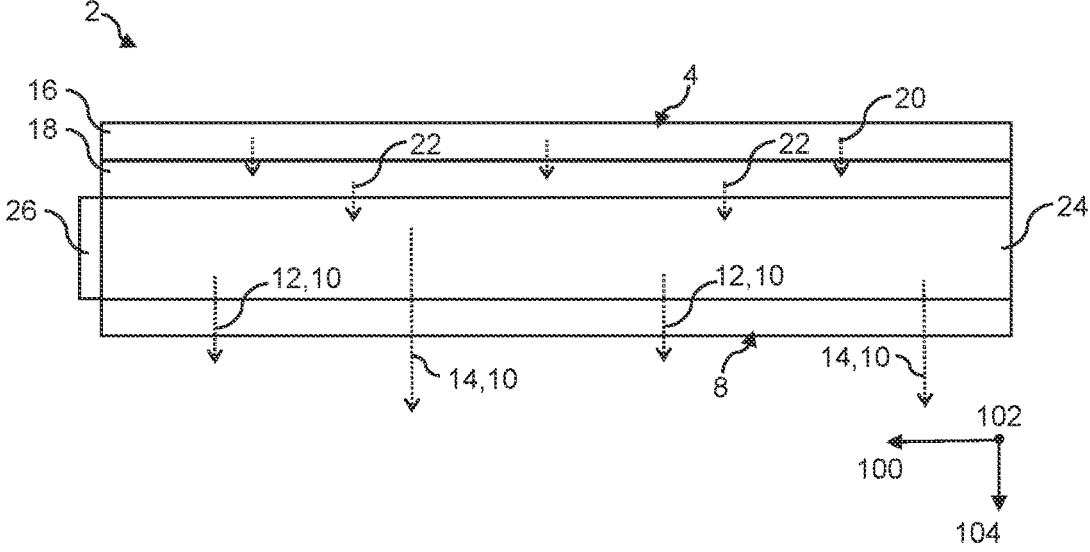
FIG. 2 is a side cross-sectional view showing an embodiment of the optical display device of FIG. 1.

Referring to FIG. 2, the collimated light generation system 4 includes a light source 16 and a collimating system 18. The light source 16 projects a light beam 20 to the collimating system 18, which processes the received light to output collimated light 22.

The diffuse light generation system 6 is includes a transparent member 24 arranged as a waveguide through which the collimated light 22 projects to form the collimated sunlight component 12. The diffuse light generation system includes a dedicated diffuse light source 26 which emits light into an edge of the transparent member 24 that extends in a depth direction. The transparent member 24 include particles (not illustrated) which scatter the internally reflected light from the light source 26. The light emitted from the light source 26 is retained within the transparent member 24 by total internal reflection until it encounters a particle and is scattered enabling it to exit the transparent member 24 as the diffuse skylight component 14. A portion of the collimated light 22 that encounters a particle may also be scattered in this manner.

In variant embodiments, which are not illustrated, the diffuse light generation system may omit the dedicated diffuse light source, with the diffuse skylight component being provided by the portion of the collimated light that is scattered by the transparent member.

The output aperture 8 is planar and aligned in a longitudinal direction 100 and lateral direction 102. A thickness of the device 2 is arranged in a depth direction 104.

Figure 3:
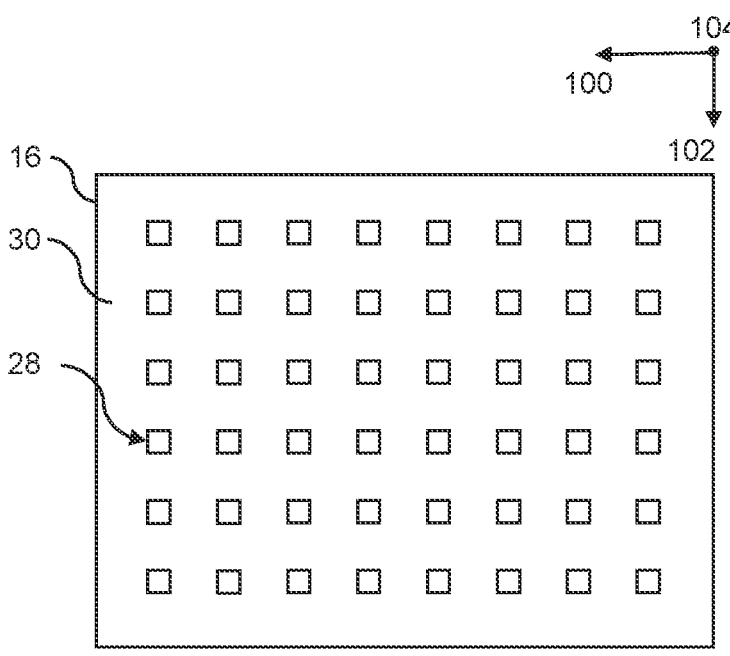
FIG. 3 is a plan view showing an embodiment light source of the optical display device of FIGS. 1 and 2.

Referring to FIG. 3, the light source 16 comprises a planar array of individual light sources 28 arranged on a common substrate 30. There are 6×8, hence 46 light sources 28, which are arranged equally from each other at vertices of a virtual square in a longitudinal 100 and a lateral direction 102. The device 2 comprises one single substrate 30 that the light sources are arranged on.

Figure 4:
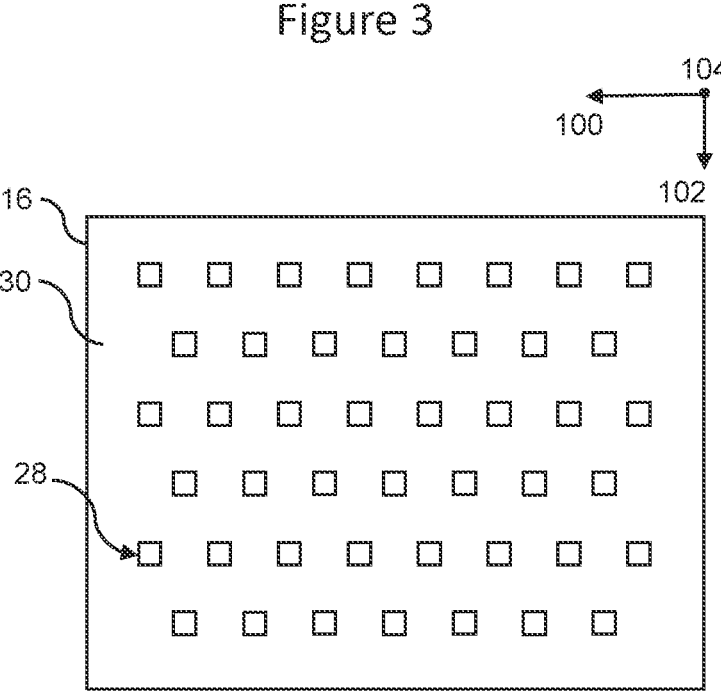
FIG. 4 is a plan view showing an embodiment light source of the optical display device of FIGS. 1 and 2.

Referring to FIG. 4, an alternative arrangement of the light source 16 comprises a planar light source array of individual light sources 28 which are alternatively arranged on the common substrate 30. The light sources 28 are staggered by row in the longitudinal direction 100 such that light sources from a row are arranged opposite a mid-point between light sources of an adjoining row.

Figure 5:
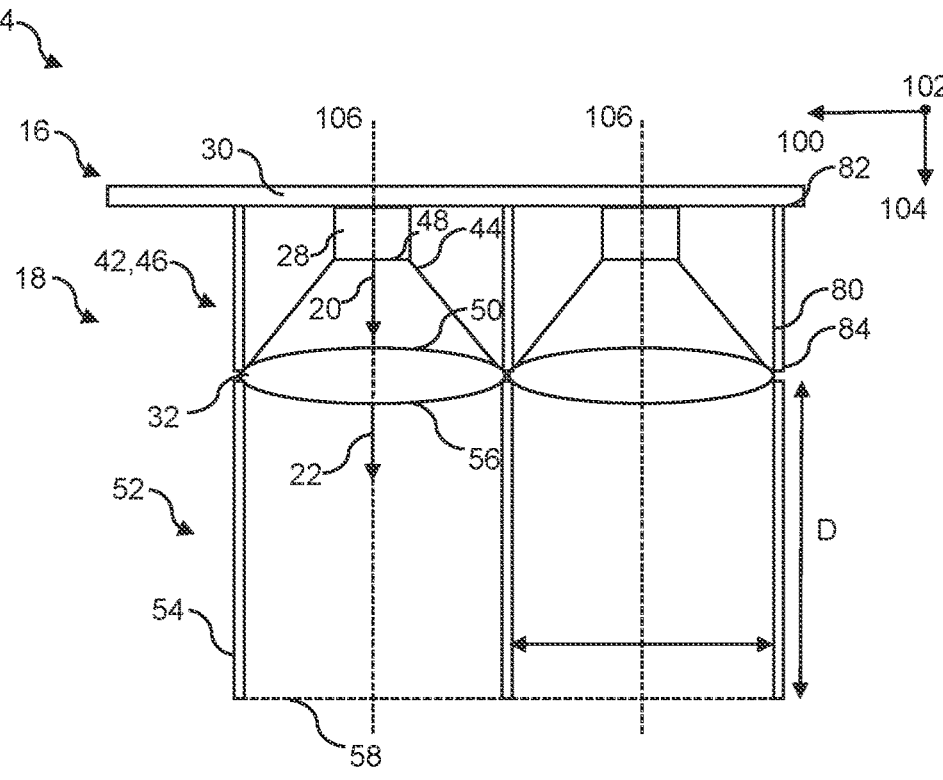
FIG. 5 is a side cross-sectional view showing an embodiment of the optical display device of FIGS. 1 to 5.

Referring to FIG. 5, the light source 16 of FIG. 3 or 4 is shown with respect to an optical axis 106 that intersects a centre of a light sources 16 (e.g. so that a primary axis of projection of the light sources is aligned to the optical axis) and is normal to the plane of the substrate 30.

In variant embodiments, which are not illustrated: there are other numbers of light sources; the light sources may have other arrangements, e.g. at vertices of a virtual triangle or hexagon; the substrate is split up into first and second substrates, or other number of substrates, with each comprising a group of light sources e.g. 16 or 20 or other number greater than 10, which are arranged in a 2 dimensional array.

The light sources 28 are arranged as LEDs, which are printed on the substrate 30. The substrate 30 is arranged as a printed circuit board. The printing can be by an ink jet, in which layers are added to the substrate form one or more of: an anode layer; cathode layer; semi-conductor layers; conductive layers; emissive layers. Printing may achieve a high degree of accuracy in positing the LEDs, which is important since the LEDs and lenses require precise alignment to each other.

As used herein the term "printed circuit board" or "PCB" may refer to a laminated sandwich structure of conductive and insulating layers that may be based on one or more of: a PI (polyimide) film; PET (polyester) film; flexible copper clad laminate (FCCL); glass.

The LED light sources 28 have a chip size less than 100 μm (e.g. micro LEDs) or; 100-200 μm (e.g. mini LEDs), and; 0.1 mm-3 mm. As used herein the term "chip" in respect of an LED may refer to the part of the semiconductor that emits light. As used herein the term "size" in respect of the chip may refer to the largest lateral or longitudinal dimension, such as a side length of the chip. The LED may have any suitable implementation, e.g. mini, micro OLED etc.

In variant embodiments, which are not illustrated: other LED chip sizes are implemented; other light sources are implemented including a lamp with an element or an arc lamp; the light sources may not be formed on a common substrate, e.g. they may be individually arrange/connected to the collimating lens and/or the light sources may be arranged on a dedicated substrate for each light source rather than a common substrate; the light sources may be alternatively formed on the common substrate, e.g. by pick and place.

Figure 6:
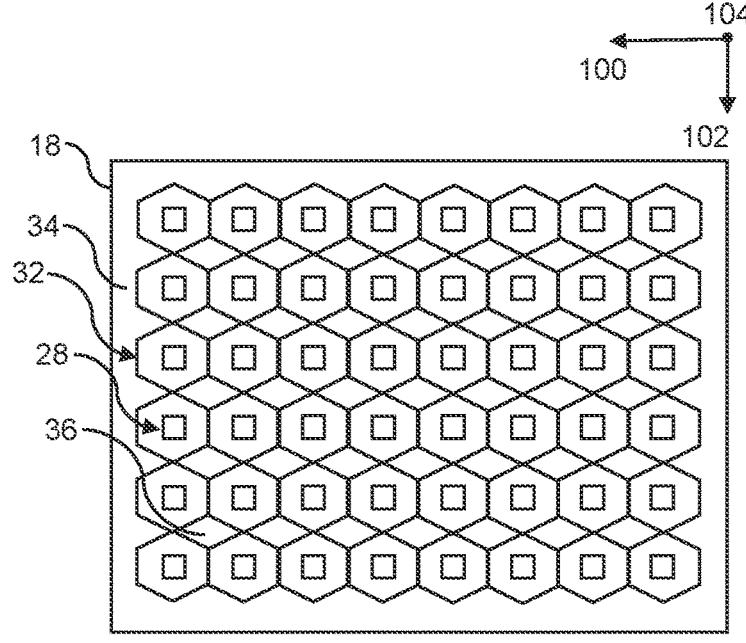
FIG. 6 is a plan view showing an embodiment collimating system of the optical display device of FIGS. 1 and 2.

Referring to FIGS. 5 and 6 the collimating system 18 comprises a planar lens array of individual collimating members 32 that comprises lenses formed integrally from a common substrate 34. The device 2 comprises one single substrate 34 that the collimating members are formed from.

The lens array is formed of a plastic based material, e.g. polycarbonate or other suitable material, by compression moulding. The lenses are formed as hexagonally shaped members when viewed in a plane than extends in the longitudinal 100 and lateral 102 directions. The lenses are arranged in a non-tessellating manner, such that there are voids 36 between the lenses as will be discussed.

The lens array is arranged to be mated with the light source array of FIG. 3, such that the centre of the light sources 28 and optical axis 106 is aligned with the optical axis of the lenses. In this way the light sources 28 are each arranged with a dedicated collimating member 32 so that light emitted from the light sources is collimated. The lenses have Fresnel configuration.

The chip size of the LED light sources 28 generally corresponds to a diameter of the lenses of the individual collimating members 32. The chip size may be: at least 2 or 10 or 40 or 50 or 60 or 70 or 80% of the lens diameter; 100% or the lens diameter; less than 2.5 or 5 or 10 or 20 or 40 or 50 or 80 or 90% of the lens diameter; any compatible combination of the aforesaid maximum and minimum ranges. Having the chip size of the LED light sources 28 substantially the diameter of the lenses may reduce hots spots in the collimated light.

Figure 7:
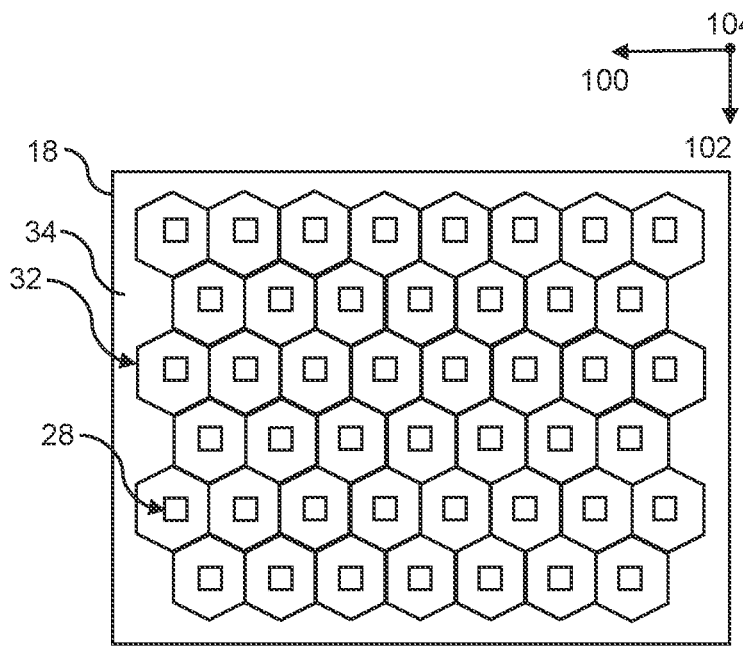
FIG. 7 is a plan view showing an embodiment collimating system of the optical display device of FIGS. 1 and 2.

Referring to FIG. 7 an alternative arrangement of the collimating system 18 comprises a planar lens array of individual collimating members 32 that comprises hexagonal lenses that are arranged in a tessellating manner such that the previously described voids are not present. The lens array of FIG. 7 is arranged to be mated with the light source array of FIG. 4, such that the centre of the light sources 28 and optical axis 106 is aligned with the optical axis of the lenses. In this way the light sources 28 are each arranged with a dedicated collimating member 32 so that light emitted from the light sources is collimated. The lenses have Fresnel configuration.

In variant embodiments, which are not illustrated: the lens array is formed of a different material e.g. glass; the lens array is formed of individual lenses that are supported by a common carrier; the lenses may have other shapes, including as square, circular and as a conventional, non-Fresnel configuration; the substrate is split up into first and second substrates, or other number of substrates, with each comprising a group of collimating members e.g. 16 or 20 or other number greater than 10, which are arranged in a 2 dimensional array; the lens array is alternatively formed e.g. by printing.

A number of collimating members 32 on the substrate 34 is matched to a number of light sources 28 on the substrate 30. In this way, as part of assembly, the substrate 34 can be aligned and connected on the substrate 30, prior to insertion into a housing (not illustrated) of the device 2. In variant embodiments, which are not illustrated, other arrangements of the substrates may be implemented, e.g. several of the substrates 34 are matched to one of the substrates 30 or the reverse.

Figure 8:
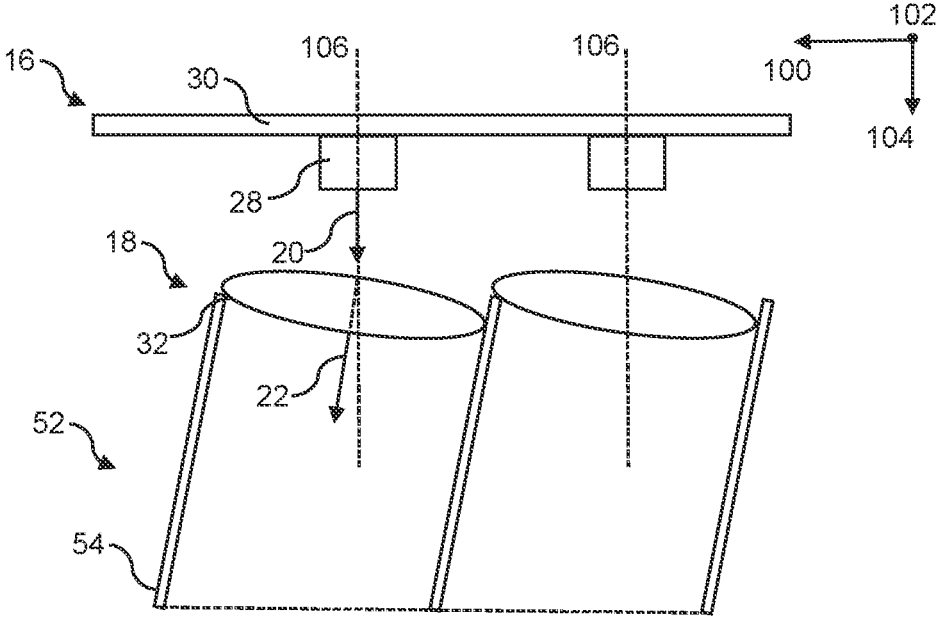
FIG. 8 is a side cross-sectional view showing an embodiment of the optical display device of FIGS. 1 to 4 and 6 to 7.

Referring to FIG. 8 the collimating members 32 are alternatively arranged with the collimated light 22 output inclined to the plane defined by the longitudinal direction 100 and lateral direction 102 (e.g. with an incidence to the normal to the surface of the output aperture of 5-30 degrees). In this way the sunlight component of the output light is inclined with respect to the plane of the output aperture 8 so that in the sky scene the sun can be observed at an angle other than directly above the observer (as would be the case for a sunlight component which is orthogonally projected to the output aperture).

In variant embodiments, which are not illustrated, rather than the inclining of the collimating members, the collimated light can project to a sheet of prismatic members, which are arranged to implement an incline in collimated light incident on an input surface by refracting the light and/or reflecting and refracting the light to an output surface.

The diameter of the lenses is less than 1 mm or; 1-2 mm; 1 mm-30 mm, and; 1-2 or 5-20 times the size or range of the chip size of the LEDs. The diameter of the lenses is defined as a suitable dimension, typically the greatest dimension for example: a diameter for a circular lens; a distance between opposed vertices for a hexagonal lens, and; a side length for a square lens etc.

In variant embodiments, which are not illustrated, the collimating system comprises a second lens array of collimating members that comprise lenses formed integrally from a common substrate. The second lens array is arranged downstream of the first lens array. An optical axis of the lenses of the planar array is aligned with an optical axis of the lenses of the second planar array. The second lens array may provide additional collimation to the first lens array whilst maintaining the compact footprint of the device. The second lens array may be inclined the plane defined by the longitudinal and lateral directions, with the first lens array parallel thereto, such that the second lens array implements the desired amount of inclination in the output light.

Referring to FIG. 5 the collimated light generation system 4 comprises a light guide 42 comprising an array of individual light guides 44 that couple the light beams 20 from the light sources 28 to the collimating members 32. The light guide array of individual light guides 44 is planar and is formed integrally from a common substrate 46.

An inlet end 48 of the light guide 42 is arranged contiguous (e.g. in contact with or in close proximity to) the chip of the LED forming the light sources 28. An air gaped connection or a direct connection between the light sources and light guides can be implemented. An outlet end 50 of the light guide 42 is arranged contiguous the collimating members 32. The light guides 44 are arranged to totally internally reflect the light bean 20.

A central axis (not illustrated) of the light guides 44 is arranged is aligned with the optical axis The light guide array is formed of a plastic based material, e.g. polycarbonate or other suitable material, by compression moulding. The light guides are formed as hexagonally shaped members when viewed in a plane than extends in the longitudinal 100 and lateral 102 directions.

The light guides 44 couples the chip size of the LED light sources 28 to the whole (including substantially whole) lens diameter such that light is uniformly transmitted to the lenses to avoid hot spots in the collimated light. Hence different chip size LEDs can be conveniently mated with different diameter lenses.

In variant embodiments, which are not illustrated: the light guide array is formed of a different material e.g. glass; the light guide array is formed of individual light guides that are supported by a common carrier; the light guides may have other shapes, including as square or circular; the light guide array is formed integrally with the lens array, and; the light guide array is omitted.

Figure 9:
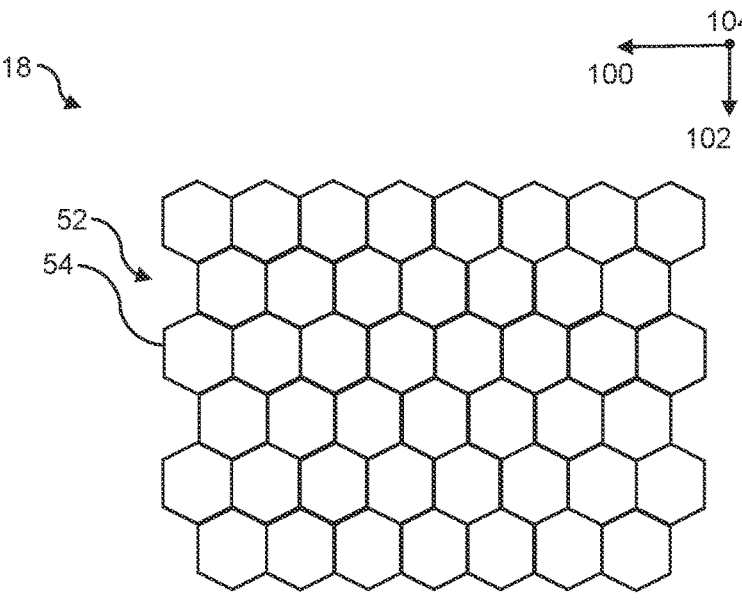
FIG. 9 is a plan view showing an embodiment of the optical element of the optical display device of FIGS. 1 and 2.

Referring to FIGS. 5 and 9 the collimated light generation system 4 comprises optical element 52 arranged to diffusively reflect stray light downstream of the collimating system 18.

The optical element 52 comprises an array of individual cells 54 that receive the collimated light 22 from the collimating system 18 and remove stray light therefrom. The optical element 52 is planar and is formed integrally from a common substrate.

An inlet end 56 of the cells 54 is arranged contiguous (e.g. in contact with or in close proximity to) the collimating member 32 of the collimating system 18. An outlet end 58 of the cells 54 is arranged to project the collimated light 22 to the output aperture 8.

The optical element 52 is formed of a plastic based material, e.g. polycarbonate or other suitable material, formed by extrusion or 3D printing. For example, an SLA printer may be used with resin that includes blue dye. The blue dye implements a blue colour in the reflected light so that it may be perceived as the diffuse skylight component 14. The cells are formed as hexagonally shaped members when viewed in a plane than extends in the longitudinal 100 and lateral 102 directions. A central axis (not illustrated) of the cells 54 is arranged aligned with the optical axis 106. The cells 54 are arranged in a tessellating manner, and hence are arranged for the light source 16 and collimating system 18 arrangements of FIGS. 4 and 6.

A depth D of the cells 54 is 2-120 times or 2-50 an internal width W of the cells. The internal width is defined as a suitable dimension, typically the greatest dimension for example: a diameter for a circular cell; a greatest distance between opposed vertices for a hexagonal cell, and; a side length for a square cell etc. The cells have a wall thickness T. T may be selected so as not to provide a visual cue of the cells to an observer when observed from typical viewing distances, e.g. greater than 0.5 meters from the output aperture. Typically T is selected to be a small as manufacturing tolerances allow, e.g. 0.2-0.5 mm. Hence a pitch P of the cells is W+T.

In variant embodiments, which are not illustrated: the optical element array is formed of a different material e.g. paper; the optical element is formed of individual cells that are supported by a common carrier; the cells may have other shapes, including as square or circular; the light guide array is formed integrally with the lens array, and; the light guide array is omitted.

In variant embodiments, which are not illustrated the pitch of the cells is less than the pitch of the collimating members. Alternatively cells are arranged to be the same pitch as the collimating members but a central axis of the cells is not aligned with the optical axis of the collimating members. Arrangements in which the central axis of the cells is not required to be aligned with the optical axis of the collimating members (be it those with a same or a different pitch) may be more convenient to assemble since precise alignment of the cells with collimating members is not required. Alternatively, the cells may be arranged with a repeating units of several cells aligned in the same position for each lens, for example, the frontal area of the lens may be exactly overlapped by a repeating unit composed of 4-50 cells.

Referring to FIG. 8 the cells 54 of the optical element 52 are arranged with the output inclined to the plane defined by the longitudinal direction 100 and lateral direction 102 (to correspond to the previously described inclination of the lenses). In this way the sunlight component of the output light is inclined with respect to the plane of the output aperture 8 so that in the sky scene the sun can be observed at an angle other than directly above the observer.

Figure 10:
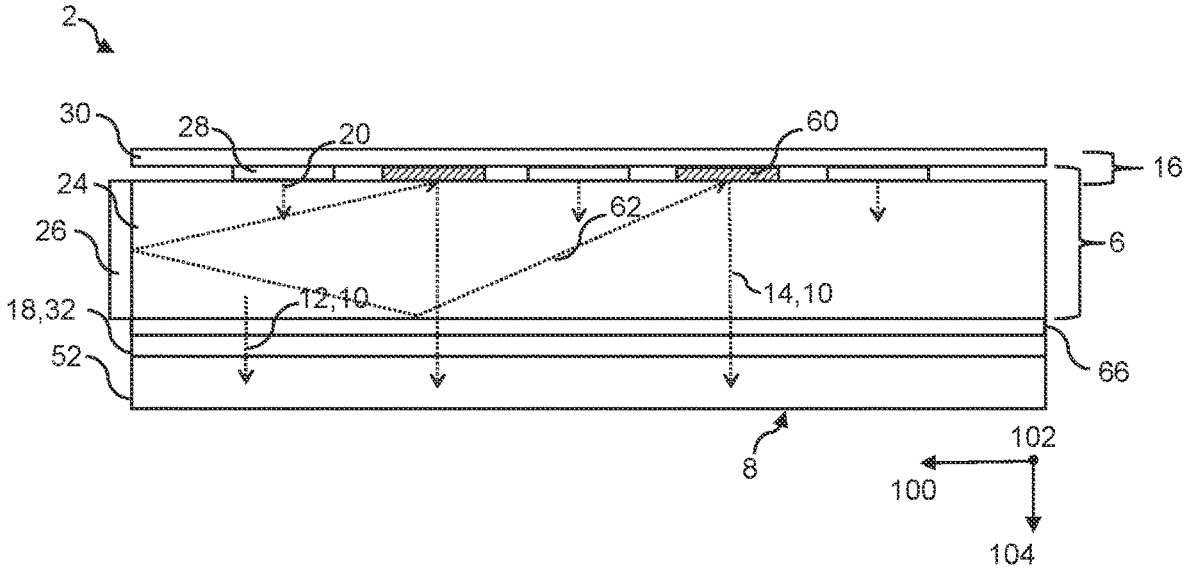
FIG. 10 is a side cross-sectional view showing an embodiment of the optical display device of FIG. 1.

Referring to FIG. 10, a variant of the diffuse light generation system 6 is shown in which the transparent member 24 is arranged upstream of the collimating system 18.

The substrate 30 of the light source 16 includes diffuser portions 60, which are arranged to decouple totally internally reflected light 62 emitted from the light source 26 from the transparent member 24 arranged as a waveguide, such that it exits the transparent member 24 as the skylight component 14. The diffuser portions 60 may be implemented as surface etching/contours or prisms or other suitable arrangement to redirect the internally reflected light. In variant embodiments, which are not illustrated, the diffuser portions are mounted only on the transparent member and not the substrate.

The skylight component 14 subsequently passes through the collimating members 32 of the collimating system 18 and to the output aperture 8. An airgap (not illustrated) is arranged between the collimating members 32 and the transparent member 24 such that the collimating members to not act to decouple the internally reflected light from the waveguide. In a similar manner an airgap (not illustrated) is arranged between the light sources 28 of the substrate 30 and the transparent member 24.

Light 20 from the light sources 28 passes through the transparent member 24 and to the collimating members 32 of the collimating system 18. Collimated light 22 exits the collimating members 32 and is filtered by the optical element 50 and exits to the output aperture 8 as the sunlight component 12.

Figure 11:
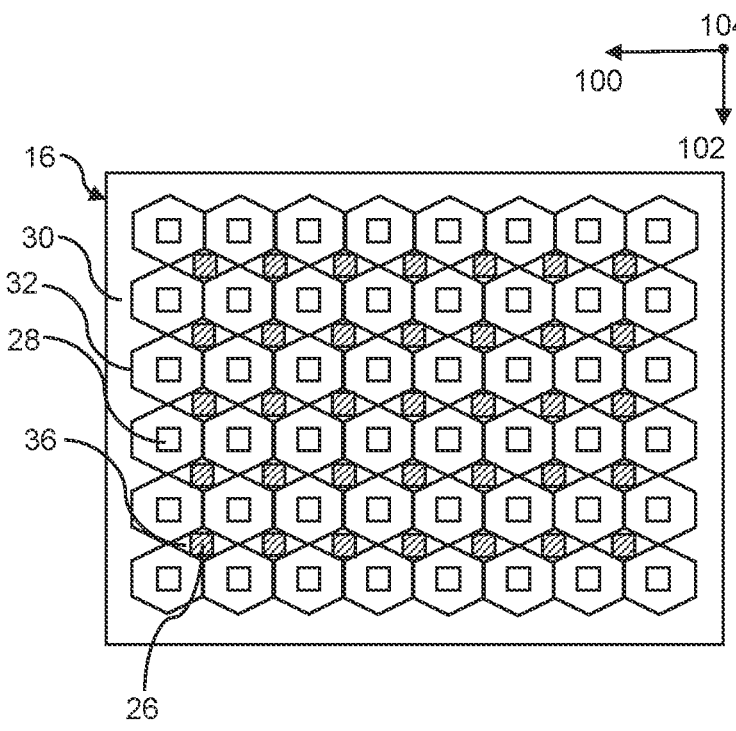
FIG. 11 is a plan view showing an embodiment of the optical display device of FIGS. 1 and 2.

Referring to FIG. 11, in a variant of the diffuse light generation system 6, the substrate 30 of the light source 16 includes a first group of the light sources 28, which are operable to project light that corresponds in colour to the sunlight component 12 that are arranged as discussed previously in association with the embodiment of FIGS. 4 and 6.

The substrate 30 further includes a second group of light sources 26 of the diffuse light generation system 6, which are operable to project light that corresponds in colour to the skylight component. The second group of light sources 26 are arranged on the substrate 30 so that the light is projected with a primary axis of projection though the voids 36 in the collimating system 18, rather than collimated by the collimating members 32. A portion of the light may also be projected though the collimating lenses. The voids 36 can be either absent material or formed of a portion of the material that does not comprise the individual collimating members 32. The voids 36 are therefore not arranged to collimate light passing therethrough.

Figure 12:
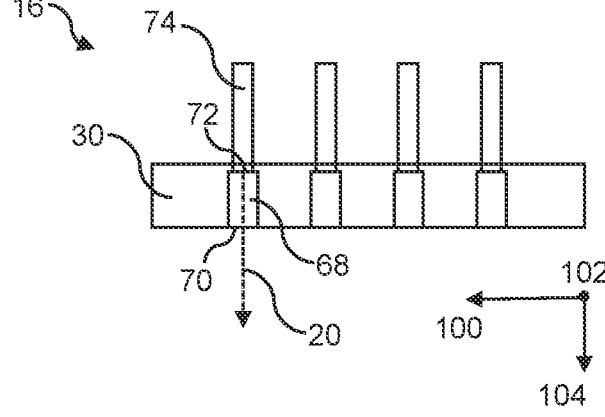
FIG. 12 is a plan view showing an embodiment light source of the optical display device of FIGS. 1 and 2.

Referring to FIG. 12, in a variant of the light source 16, the substrate 30 includes through-hole apertures 68 with an outlet end 70 and an input end 72. The input end 72 is coupled to an optical fibre 74. The optical fibre 74 are all aligned in the aperture 68 so that they emit the light 20 in the depth direction 104. The variant may be combined with any of the preceding embodiments, including the arrangement of the optical fibres on the substrate to be equivalent to the light sources 28. The optic fibres 74 can be connected to a common light source (not illustrated).

The device 2 includes an electronic control system (not illustrated) which is implemented by electrical circuitry. The control system includes an input unit a processing unit and an output unit.

The input unit comprises a user interface to receive user commands. The user interface can be integral with the device (e.g. as keys or buttons), or communicatively coupled thereto (e.g. as an external device) via a communication interface. A remote user interface enables the user to adjust the output light whilst experience the light at a typical viewing distance.

The user commands may be one or more of the following instructions: to adjust an intensity of the sunlight component or skylight component (e.g. independently of each other); to adjust a CCT of the sunlight component or skylight component (e.g. independently of each other); to adjust an angle of inclination of the output light e.g. by having lenses of the collimating system that are movably mounted to the substrate and controllable in position by an actuator or by dedicated such lenses which are separate to the collimating system.

The processing unit receives the command and provides an instruction to the output unit for the associated control of the relevant feature of the light.

In a first example, if the command is to reduce the intensity of the sunlight component then the power supplied to the light sources 28 is decreased. The output unit may for example modulate pulses to the light sources via PWM to achieve the reduced power.

In a second example, if the command is to have a bluer CCT (i.e. a higher CCT) of the skylight component then the light sources 26 can be controlled to emit more blue light. This may be achieved by implementing the light sources 26 as RGB LEDs or as separate LEDs of different colours. In both cases the amount of blue is increased relative to the other components.

Referring to FIG. 5, the substrate 34 comprising the colimiting members 32 is supported on the substrate 30 comprising the light sources 28 by a support member 80. The support member 80 extends in the depth direction 104 to interconnected said substrates 30, 34.

At a proximal end 82, the support member 80 is arranged as cells that correspond in shape to a periphery of the lenses. At a distal end 84, the support member 80 is arranged as cells that correspond in shape to a periphery of the lenses. The support member 80 is formed of or has a surface finish of an absorbent material, (e.g. a black body, which can be achieved by a black paint) such an implementation may help reduce propagation of stray light. It may also isolate light source and lens pairs from light from adjacent light sources.

The proximal end 82 of the support member 80 may have first engagement portions (not illustrated) to engage with complimentary second engagement portions on the substrate 30. The distal end 84 of the support member 80 at a distal end may have first engagement portions (not illustrated) to engage with complimentary second engagement portions on the substrate 34. In an example, the first engagement portion is one of protrusions or slots and the second engagement portion is the other of protrusions or slots. The engagement can be interference fit or merely for lateral and longitudinal portioning or other suitable configuration. Said engagement of the support member 80 can ensure precise positing of the light sources 28 with respect to the collimating member 32 with convenient assembly.

In variant embodiments, which are not illustrated: the support member may taper to the substrate 30, such that light from the second group of light sources arranged on the substrate 30 can be directed around the collimating elements 32 and to the previously discussed voids in the lens array; the support member may be omitted; the support member may be integrated with or as the light guide.

The device 2 is arranged in a housing (not illustrated) that houses the aforedescribed components. A depth of the device 2 is less than 10 or 5 or 2 or 1 cm, with a minimum of 5 mm.

Figure 13:
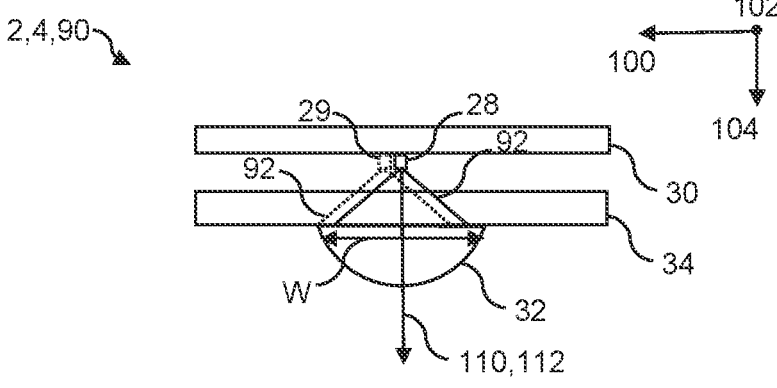
FIG. 13 is a side cross-sectional view showing an embodiment of the optical display device of FIG. 1.

Referring to FIG. 13, the associated embodiments with which may apply to any preceding embodiment or another embodiment disclosed herein, the light sources 28 of the first common substrate 30 project along a central axis 110 and the lenses 32 of the second common substrate have an optical axis 112.

The first and second common substrate have a thermal compensation arrangement 90 to maintain an alignment condition between the optical axis 112 of the lenses 32 and the central axis 110 of the associated light source at an operating temperature of said device.

The alignment condition can be quantified by the offset in the longitudinal 100 and/or lateral direction 102, and can be met if there is either perfect alignment (e.g. coincident axes as illustrated) or less than one of 6.5%; 5%; 10%; 15% misalignment in respect of a percentage of the lens width W (as illustrated for the light source 29). For example, a 6.5% misalignment for a 1 mm lens width would be 0.065 mm.

The term operating temperature can refer to a typical steady state temperature that the device achieves in operation, as opposed to a ramp-up non-steady state temperature, which is experienced as the device is initially switched on from typically an ambient temperature.

The alignment condition can require that a periphery of a light cone 92 of the light source 28, 29 is maintained within a periphery of an associated lens 32 (e.g. within the bounds of the width w) such that it projects on to a portion of the lens that is able to collimate the inbound light, rather than for example to a neighboring lens that might otherwise cause cross talk.

The thermal compensation arrangement can be implemented by selecting a thermal expansion coefficient $\alpha 1$ of the first common substrate 30 of the light sources 28 and a thermal expansion coefficient $\alpha 2$ of the second common substrate 32 of the lenses 34.

In a first example, $\alpha 1$ and $\alpha 2$ are selected such that the optical axis of the lenses is maintained in alignment (as defined previously) with the central axis of the light source at the operating temperature, and is not maintained in alignment outside of said operating temperature. In this example the device may be assembled at the operation temperature with the alignment condition met.

In a second example, $\alpha 1$ and $\alpha 2$ are selected (e.g. matched including substantially matched) such that the optical axis of the lenses is maintained in alignment with the central axis of the light source at the operating temperature, and is maintained in alignment outside of said operating temperature (e.g. for all or some temperatures outside of the operating temperature).

For the first and second examples, the first and second substrates have substantially different thermal expansion coefficients, a further layer of substrate of a different thermal expansion coefficient can be added to one or both of the substrates, so that the average thermal expansion coefficients are matched. In an example, the lenses are individually mounted on a carrier substrate with said matched thermal expansion coefficient.

As used in this specification, any formulation used of the style "at least one of A, B or C", and the formulation "at least one of A, B and C" use a disjunctive "or" and a disjunctive "and" such that those formulations comprise any and all joint and several permutations of A, B, C, that is, A alone, B alone, C alone, A and B in any order, A and C in any order, B and C in any order and A, B, C in any order. There may be more or less than three features used in such formulations.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Unless otherwise explicitly stated as incompatible, or the physics or otherwise of the embodiments, example or claims prevent such a combination, the features of the foregoing embodiments and examples, and of the following claims may be integrated together in any suitable arrangement, especially ones where there is a beneficial effect in doing so. This is not limited to only any specified benefit, and instead may arise from an "ex post facto" benefit. This is to say that the combination of features is not limited by the described forms, particularly the form (e.g. numbering) of the example (s), embodiment(s), or dependency of the claim(s). Moreover, this also applies to the phrase "in one embodiment", "according to an embodiment" and the like, which are merely a stylistic form of wording and are not to be construed as limiting the following features to a separate embodiment to all other instances of the same or similar wording. This is to say, a reference to 'an', 'one' or 'some' embodiment(s) may be a reference to any one or more, and/or all embodiments, or combination(s) thereof, disclosed. Also, similarly, the reference to "the" embodiment may not be limited to the immediately preceding embodiment.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the present disclosure.

LIST OF REFERENCES

2 Device
  4 Collimated light generation system
    12 Sunlight component
    16 Light source
      20 light beam
        90 Light cone
      28 Light sources
      74 Optical fibres
    30 Substrate
      68 Apertures
      70 Outlet end
      72 Inlet end
    18 Collimating system
      22 Collimated light
      34 Substrate
        32 Collimating members (lenses)
        36 Voids
    42 Light guide
      46 Substrate
        44 Light guides
        48 Inlet
        50 outlet
      52 Optical element
        54 Cells
          56 Inlet
          58 Outlet
  6 Diffuse generation system
    14 Skylight component
    24 Transparent member
      60 Diffuser portions
    26 Light source
      62 Internally reflected light/light of diffuse light source
    64 Air gap
  8 Output aperture
    10 Output light
  80 Support member
    82 Proximal end
    84 Distal end
100 Longitudinal direction
102 Lateral direction
104 Depth direction

The invention claimed is:

1. An optical display device arranged to create a perception of a sky scene in output light, the optical display device comprising:
  a collimated light generation system comprising a light source and a collimating system;
  a diffuse light generation system, and;
  an output aperture for the output light;
  the diffuse light generation system arranged to generate a diffuse skylight component in the output light, and the collimated light generation system arranged to generate a collimated sunlight component in the output light,
  wherein the light source comprises a planar array of light sources arranged on a first common substrate,
    the collimating system comprises a planar array of collimating members that comprise lenses formed integrally from a second common substrate,
  the light sources each arranged with an associated collimating member so that light emitted from the light sources is collimated, and
  the planar array of light sources and the planar array of collimating members are aligned with a plane of the output aperture,
  wherein the device is configured with the output aperture arranged for viewing whilst mounted to a wall or ceiling from a viewing distance of greater than 0.5 m, and the output aperture has a side length of at least or greater than 0.5m,
  the device comprising an alignment system arranged to align the first common substrate and the second common substrate such that the light sources are each arranged in alignment with an associated collimating member.

2. The optical display device of claim 1, wherein the lenses of the planar array are formed of a plastic based material by compression moulding and have a square or hexagonal shape.

3. The optical display device of claim 1, wherein the collimating system comprises a second planar array of collimating members that comprise lenses formed integrally from a third common substrate, wherein an optical axis of the lenses of the planar array is aligned with an optical axis of the lenses of the second planar array.

4. The optical display device of claim 1, wherein light guides couple the light sources to the lenses of the collimating system, wherein the light guides are formed integrally from a fourth common substrate.

5. The optical display device of claim 1, wherein the light sources are printed on the first common substrate, and the first common substrate of the light sources is arranged as a printed circuit board.

6. The optical display device of claim 1, wherein the light sources are LEDs, that have a chip size of one of the following:

less than 100 μm or;

100-200 μm, and;

0.1 mm-3 mm.

7. The optical display device of claim 1, wherein a diameter of the lenses is one of the following:

less than 1 mm or;

1-2 mm;

1 mm-30 mm.

8. The optical display device of claim 1, wherein the collimated light generation system includes an optical element arranged to diffusively reflect stray light from the collimating system, the optical element is arranged as a plurality of cells, with an open entrance end to receive light from the collimating system and an open exit end to output light, wherein a pitch of the cells is less than a diameter of the lenses and/or the cells are arranged so that a central axis of at least some of the cells is not aligned with the optical axis of the lenses and/or a depth of the cells is 2-120 times a pitch of the cells.

9. The optical display device of claim 1, comprising a thermal compensation arrangement, which is configured to maintain an optical axis of the lenses in alignment with a central axis of the associated light source at an operating temperature range of said device.

10. The optical display device of claim 9, wherein the operating temperature range is 10-30 degrees Celsius.

11. The optical display device of claim 9, wherein the optical axis of the lenses is maintained in alignment with the central axis of the light source, such that a periphery of a light cone of a light source is maintained within a periphery of an associated lens.

12. The optical display device of claim 9, wherein the thermal compensation arrangement comprises a thermal expansion coefficient $\alpha 1$ of the first common substrate of the light sources and a thermal expansion coefficient $\alpha 2$ of the second common substrate of the lenses, wherein:

1) $\alpha 1$ and $\alpha 2$ are selected such that the optical axis of the lenses is maintained in alignment with the central axis of the light source at the operating temperature, and is not maintained in alignment outside of said operating temperature, or;

2) $\alpha 1$ and $\alpha 2$ are matched such that the optical axis of the lenses is maintained in alignment with the central axis of the light source at the operating temperature, and is maintained in alignment outside of said operating temperature.

13. The optical display device of claim 1, wherein the diffuse light generation system comprises a diffuser, with a diffuse light source coupled to an edge of the diffuser, wherein the diffuser is arranged with the collimated sunlight component to project therethrough.

14. The optical display device of claim 1 wherein a depth of the optical display device is less than 5 or 2 or 1 cm.

15. A method of assembling a device to create a perception of a sky scene in output light, the method comprising arranging the following items on parallel planes to each other:

a planar array of light sources arranged on a first common substrate;

a planar array of collimating members that comprise lenses arranged integrally on a second common substrate, and;

an output aperture;

wherein the device is configured with the output aperture arranged for viewing whilst mounted to a wall or ceiling from a viewing distance of greater than 0.5 m, and the output aperture has a side length of at least or greater than 0.5m, the device comprising an alignment system arranged to align the first common substrate and the second common substrate such that the light sources are each arranged in alignment with an associated collimating member.

16. A method of generating a perception of a sky scene in output light, the method comprising:

generating a collimated sunlight component in the output light with a planar array of light sources arranged on a first common substrate, which project through a collimating system that is arranged as a planar array of collimating members that comprise lenses arranged integrally on a second common substrate, and;

generating a diffuse skylight component in the output light with a diffuse light generation system;

wherein the device is configured with the output aperture arranged for viewing whilst mounted to a wall or ceiling from a viewing distance of greater than 0.5 m, and the output aperture has a side length of at least or greater than 0.5m, the device comprising an alignment system arranged to align the first common substrate and the second common substrate such that the light sources are each arranged in alignment with an associated collimating member.

17. The optical display device of claim 1 wherein the alignment system may include one or more of the following configurations: protrusions that extend through apertures in one or both the substrates; aligned peripheral edges that are held in alignment with each other by a clamp, which may be formed as part of a housing of the display device.

18. An optical display device arranged to create a perception of a sky scene in output light, the optical display device comprising:

a collimated light generation system comprising a light source and a collimating system;

a diffuse light generation system, and;

an output aperture for the output light;

the diffuse light generation system arranged to generate a diffuse skylight component in the output light, and the collimated light generation system arranged to generate a collimated sunlight component in the output light, wherein the light source comprises a planar array of emission sources, the collimating system comprises a planar array of collimating members that comprise lenses formed integrally from a common substrate, the emission sources each arranged with an associated collimating member so that light emitted from the emission sources is collimated, and the planar array of emission sources and the planar array of collimating members are aligned with a plane of the output aperture, wherein the device is configured with the output aperture arranged for viewing whilst mounted to a wall or ceiling from a viewing distance of greater than 0.5 m, and the output aperture has a side length or diameter of at least or greater than 0.5m, the device comprising an alignment system arranged to align the planar array of emission sources and the common substrate such that the emission sources are each arranged in alignment with an associated collimating member.

19. The optical display device of claim 17 comprising an air gap arranged between the planar array of emission sources and the planar array of collimating members.

20. The optical display device of claim 17, wherein light of the collimated light generation system is projected via a light guide to the planar array of collimating members.

21. The optical display device of claim 19, wherein the light guide receives light from an emitting portion of the light source and conveys the light to an output surface of the light guide.

22. The optical display device of claim 1, comprising an air gap arranged between the planar array of light sources and the planar array of collimating members.

\* \* \* \* \*